Figure 3:
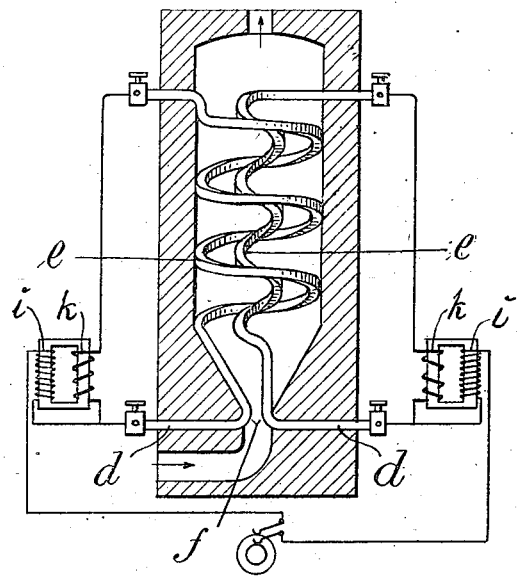

No. 880,464. PATENTED FEB. 25, 1908.
A. J. PETERSSON.
APPARATUS FOR TREATING GASES AND GAS MIXTURES BY MEANS
OF VOLTAIC ARCS.
APPLICATION FILED SEPT. 6, 1905.
2 SHEETS—SHEET 1.
Fig: 1.
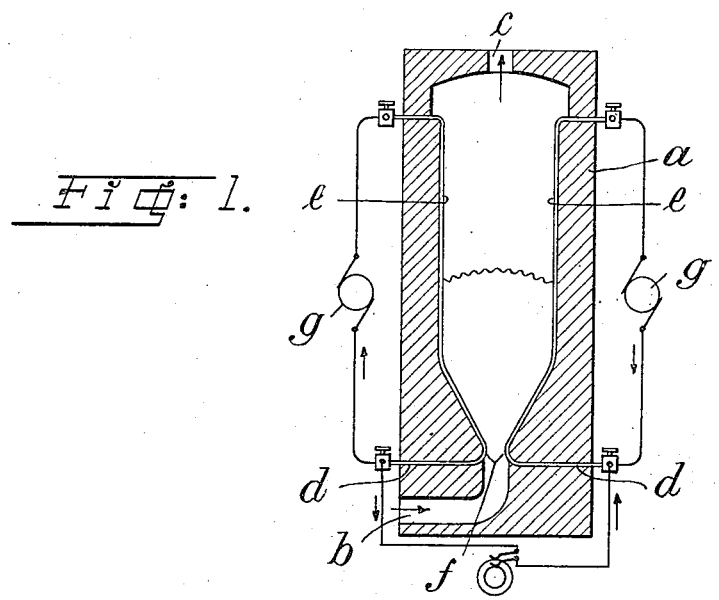
Fig: 2.
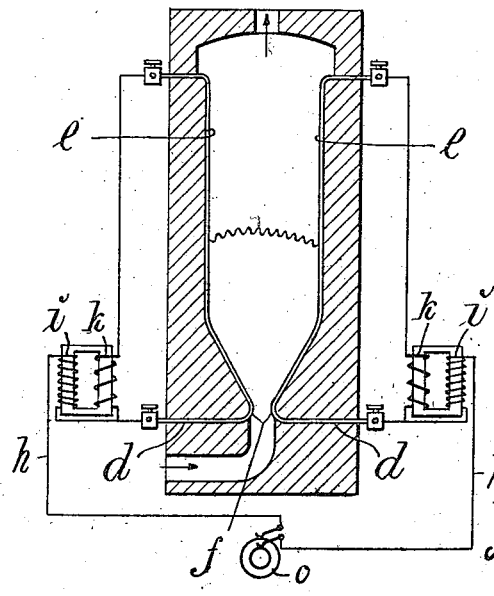
Witnesses
Emil Wakeberg
Fredr. Nordyd.
Inventor
Albert J. Petersson No. 880,464. PATENTED FEB. 25, 1908.
A. J. PETERSSON.
APPARATUS FOR TREATING GASES AND GAS MIXTURES BY MEANS OF VOLTAIC ARCS.
APPLICATION FILED SEPT. 6, 1905.

2 SHEETS—SHEET 2.

Witnesses
Emil Wahlberg
Fredr. Nordijö

Inventor
Albert J. Petersson

UNITED STATES PATENT OFFICE.

ALBERT JOHAN PETERSSON, OF ALBY, SWEDEN.

APPARATUS FOR TREATING GASES AND GAS MIXTURES BY MEANS OF VOLTAIC ARCS.

No. 880,464.  Specification of Letters Patent.  Patented Feb. 25, 1908.

Original application filed August 23, 1904, Serial No. 221,907. Divided and this application filed September 6, 1905.
Serial No. 277,260.

*To all whom it may concern:*

Be it known that I, ALBERT JOHAN PETERSSON, a subject of the King of Sweden, and resident of Alby, Sweden, have invented new and useful Improvements in Apparatus for Treating Gases and Gas Mixtures by Means of Voltaic Arcs, of which the following is a specification, reference being had to the drawings, accompanying and forming a part hereof.

This invention relates to an apparatus for treating gases and gas mixtures by means of voltaic arcs.

When reactions between gases take place under the influence of the electric arc the latter acts in an ionizing manner. The compounds obtained are, however, again disassociated by the electric arc, on account of which it is, as will be easily understood, important to bring them away out of action of the arc as quickly as possible, or which is the same, to let the arc act upon as many gas molecules as possible.

The present invention relates to an apparatus for gaining the said result in a more perfect manner than heretofore, and my invention consists, principally, in the combination of a furnace chamber, electrodes extending in the same general direction in the said furnace chamber, a source of electric current connected to the said electrodes for creating electric arcs between the same, and means for creating electrodynamic forces for strengthening the displacing action upon the arcs exerted by the currents flowing through the electrodes to the said arcs.

In the accompanying drawings I have shown diagrammatically some forms of my improved apparatus.

Referring to Figure 1 of the drawing, *a* represents the walls of the furnace or chamber containing the gases to be treated, provided with openings *b, c* for leading the gases into the apparatus and drawing off the same therefrom. The electrodes *d, d*, which should be insulated from the walls *a* if the latter are of electrically conducting material, are inside the gas-chamber bent and so arranged as to extend along or run parallel to each other. The parts *e, e*, of the electrodes extending along each other may be of different shapes for different purposes. They may thus be rectilinear, as is shown in Fig. 1, or they may be in the shape of spirals, circles, and so on.

It is not necessary that they are formed by linear conductors. They may be surface-shaped, consisting, for instance, of hollow metal cylinders, plates or like. For promoting the striking of the arc the electrodes may at some suitable point be placed in poximity to each other, or any suitable device may be provided at that point for striking the arc through the mass of gas. Eventually the striking of the arc may be facilitated by means of temporary increase of the voltage at the electrodes, for instance by condenser discharges or the like, by an extra transformer for high voltage or the like.

After the arc, which may be considered to be a movable conductor, has been struck at *f*, the same is displaced by electrodynamic forces created in the furnace by leading electric currents through electric conductors. Each of the successive arcs created at *f* will in the same manner be driven upwards, on account whereof the largest part of the gas flowing upwards will on different points be crossed by the successive arcs. The said electrodynamic forces may be created by means of specially generated currents, which are led through the one or both of the electrodes as is shown in Fig. 1. Dynamo machines *g, g* or other sources of electricity may thus be connected to each or one of the electrodes so that each or one of the latter together with the source of current and the wires form a closed circuit *e, f, d, g*. The main current forming the arc and the currents generated by the source of current *g* may be of any suitable kind, whereby the forces acting upon the arc in accordance with the well known laws for the action of electric currents upon each other obtain a constant or alternate direction depending on the direction of the currents at every special moment.

Instead of leading the extra currents through the electrodes, conductors for the said currents may be provided, the said conductors being arranged in the apparatus in such manner that the currents flowing through the same have an electrodynamic influence on the arcs.

Another device especially adapted for alternating current is shown in Fig. 2. The conductors *h*, leading the current from the source of current *o* to the apparatus constitute primary circuits *i* of alternating current transformers and continue thereupon to the electrodes $d$, the ends of which are connected to the secondary circuits $k$ of the said transformers so that the said secondary windings, the wires leading the current to the electrodes, and the latter form closed circuits. This apparatus works as follows. When the voltaic arc is formed at $f$, the primary windings $i$ are passed by a current which is equal to that in the arc, and the said current induces in the secondary windings $k$ a current which is synchronous and may be adjusted so as to correspond in phase to the primary current, and the strength of which compared to that of the primary circuit is as the respective turns of the windings of the transformer reversed. It is thus possible to obtain in the secondary windings currents which are for instance 10, 100, 1000 or more times stronger than that in the arc, whereby a proportionally stronger displacing influence on the arc is obtained.

Another constructional form of the apparatus is shown in Fig. 3, in which the electrodes form spirals. The apparatus is provided with similar transformer device as that shown in Fig. 2. The parts $e$, $e$, of the electrodes between which the arcs are formed are spirally wound with the same pitch but with different diameters, the one spiral being placed within the other. During the operation the arcs will here run along the spirals and act at many points of the gas mass. For the inner spiral a straight conductor may be substituted.

Figure 4:
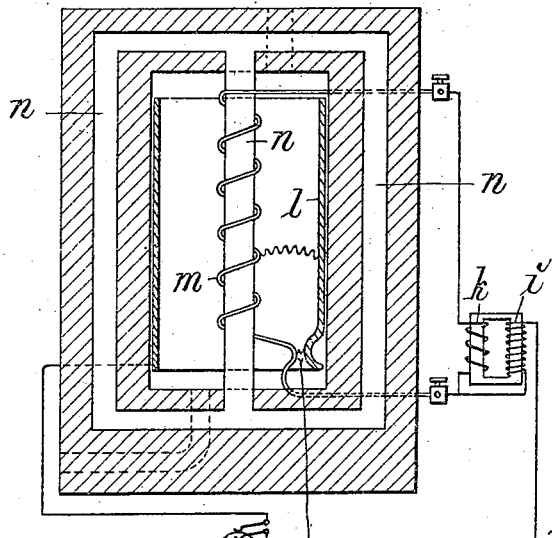

If the one or both of the electrodes be not of linear shape the said extra current for influencing the arcs may be obtained by electromagnetic induction directly of the non-linear electrode or electrodes which in this case themselves form closed circuits for the said extra currents. Such a device is shown in Fig. 4, a cylinder $l$ of metal-plate constituting the one electrode, while the other electrode is a spiral $m$. The latter is placed on an iron core $n$ suitably forming a closed magnetic circuit, as shown. The said spiral constitutes the primary member of a transformer of which the said cylinder $l$ is the secondary member. The primary circuit is supplied with current from a series transformer $i$, $k$, inserted in the main circuit. The latter runs from the primary winding $i$ of the transformer to the one end of the spiral and therefrom in forming the arc to the cylinder $l$, and from the latter to the other pole of the source of current. The distance between the cylinder $l$ and the lower end of the spiral may in any suitable way be decreased in order that the arcs may strike. The latter will under the influence of the currents flowing through the spiral and the cylinder follow the spiral $m$ while moving through the mass of gas.

The forms of apparatus described above may obviously be modified at will as to the shape of the electrodes, the principle of the invention being to provide means for exerting a strengthened electrodynamic displacing action upon the arcs.

In an application, Serial No. 221907 filed August 23rd 1904, of which the present application is a division, I have claimed the method of treating gases and gas-mixtures by means of voltaic arcs, and I therefore, do not claim the said method here.

Having now described my invention what I claim as new and desire to secure by Letters Patent is:

1. In an apparatus for treating gases by means of voltaic arcs the combination, of a furnace chamber, electrodes extending in the same general direction in the said furnace chamber, a source of electric current connected to the said electrodes for creating the said arcs between the latter, and means for creating electrodynamic forces for strengthening the displacing action on the arcs exerted by the currents flowing through the electrodes to the said arcs, substantially as and for the purpose set forth.

2. In an apparatus for treating gases by means of voltaic arcs the combination, of a furnace chamber, electrodes extending in the same general direction in the said furnace chamber, a source of electric current connected to the said electrodes for creating the said arcs between the latter, closed circuits of which each of the said electrodes form parts, and means for generating currents in the said closed circuits, substantially as and for the purpose set forth.

3. In an apparatus for treating gases by means of voltaic arcs the combination, of a furnace chamber, electrodes extending in the same general direction in the said furnace chamber, a source of electric current connected to the said electrodes for creating the said arcs between the latter, closed circuits of which the said electrodes form parts, and transformers the secondary members of which are connected in the said closed circuits and the primary members of which are connected to the said source of electric current, substantially as and for the purpose set forth.

In testimony whereof I have signed my name to this specification in the presence of two subscribing witnesses.

ALBERT JOHAN PETERSSON.

Witnesses:
    Ernest H. L. Mummenhoff,
    Otto W. Hellmrich.